United States Patent [19]

Daniels

[11] 4,378,078
[45] Mar. 29, 1983

[54] GRANULATED MATERIAL DISPENSER

[76] Inventor: Paul J. Daniels, 2733 Riverbluff Ct. #89, Sarasota, Fla. 33581

[21] Appl. No.: 278,215

[22] Filed: Jun. 26, 1981

[51] Int. Cl.³ .......................................... B65D 88/66
[52] U.S. Cl. .................................. 222/183; 222/196
[58] Field of Search ............................. 141/360–362; 222/181, 184, 185, 196, 105, 94, 183, 129.3, 129.4

[56] References Cited

U.S. PATENT DOCUMENTS

| | | | |
|---|---|---|---|
| 3,198,395 | 8/1965 | McKinney | 222/181 X |
| 3,200,997 | 8/1965 | Creswick | |
| 3,531,019 | 9/1970 | Rodgers | 222/129.4 X |
| 3,637,115 | 1/1972 | Holm | 222/196 X |
| 3,805,999 | 4/1974 | Syverson | 222/129.4 |
| 3,837,533 | 9/1974 | Splan | 222/105 X |
| 3,889,854 | 6/1975 | Gagnon et al. | |
| 4,040,457 | 8/1977 | Niese | 141/361 |
| 4,164,964 | 8/1979 | Daniels | |
| 4,165,821 | 8/1979 | Martin et al. | 222/129.4 |
| 4,240,565 | 12/1980 | Croley | 222/183 X |

Primary Examiner—Stanley H. Tollberg
Attorney, Agent, or Firm—Benjamin P. Reese, II

[57] ABSTRACT

A device for dispensing a measured quantity of granulated food or concentrate material to a container. A hopper-like container which functions as both a shipping and storage container and an operational storage container for the granulated material to be dispensed is positioned in the interior of a housing having a recessed container filling station. A granulated material transfer tube interconnects the hopper-like container and the container filling station. A valve seat is provided on the lower end of the transfer tube. An electro-responsive, pivoted dispensing valve, having a valve head which engages the valve seat, is provided to interrupt the flow of granulated material through the transfer tube into a cup or other similar container positioned in the container filling station. A timer is provided to control the period of time which the dispensing valve remains open, and, thereby, the quantity of granulated material dispensed to the cup or other similar container. With this device, it is possible for granulated food or beverage concentrate material to be sealed in the hopper-like container by a manufacturer of such materials and remain in the hopper-like container until dispensed for reconstitution and consumption at a food and beverage service institution.

7 Claims, 6 Drawing Figures

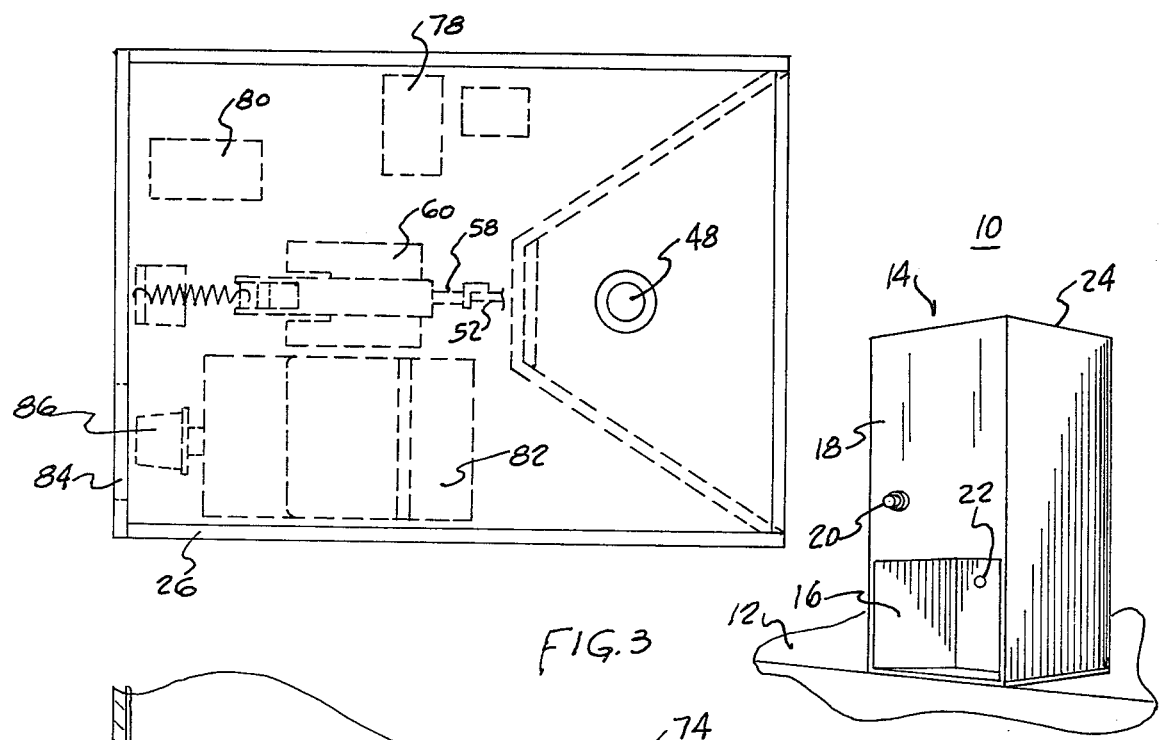
FIG. 3
FIG. 1
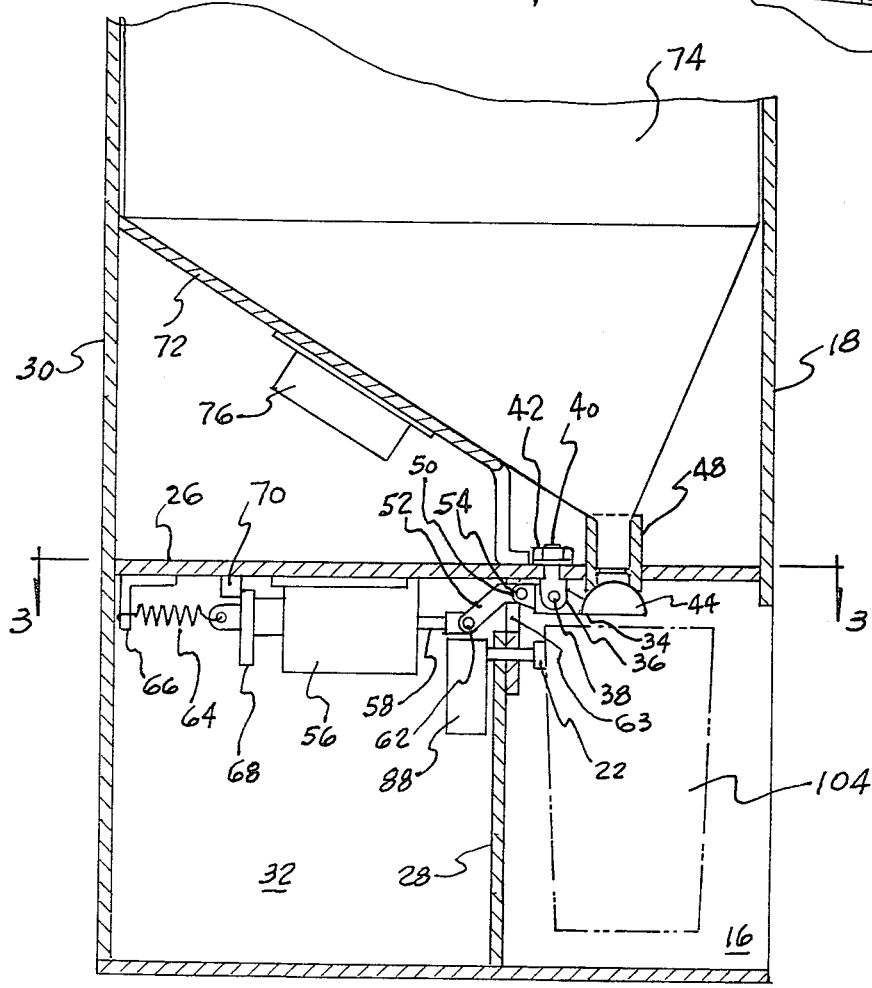
FIG. 2

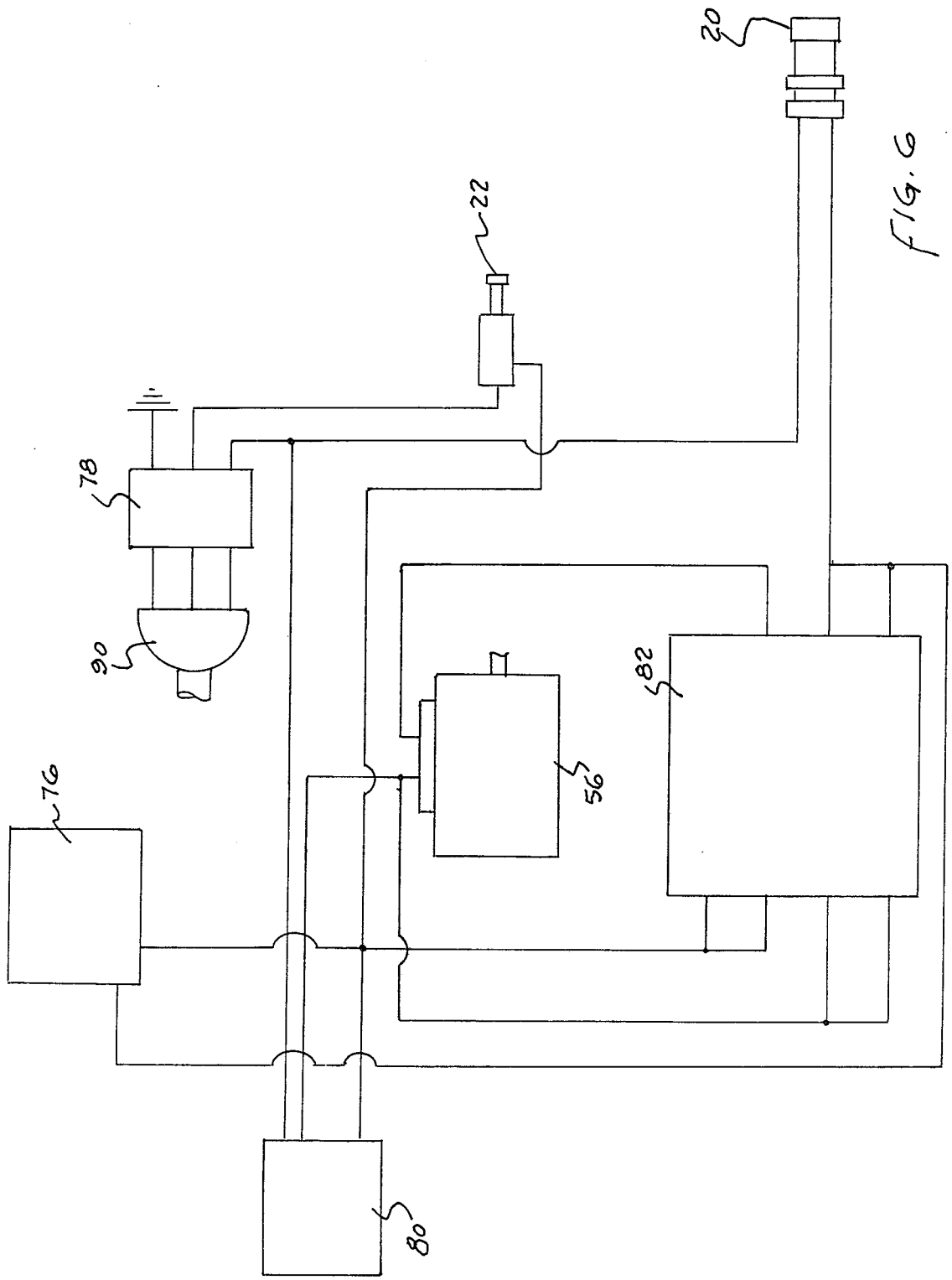

GRANULATED MATERIAL DISPENSER

BACKGROUND OF THE INVENTION

This invention relates to a new and improved device for dispensing a measured quantity of granulated material to a container.

Granulated food and beverage concentrate materials which are reconstitutable by dissolution in water are well known in the food and beverage industry. Coffee, juice drinks, milk, soups and the like which have been reconstituted from granulated food and beverage concentrate materials have been accepted by many consumers because such foods and beverages are relatively inexpensive as well as convenient to prepare and serve. Even wider consumer acceptance of such foods and beverages is anticipated as a result of the continuing improvements which are being made in the taste and palatability of such foods and beverages.

Since granulated food and beverage concentrate materials do not require refrigerated storage, substitution of foods and beverages which have been reconstituted from such materials for conventional food and beverage products reduces the energy consumption required for preparing and serving foods and beverages. And, of course, the reduced volume and weight of products for shipment which results from substitution of such foods and beverages for conventional food and beverage products further reduces such energy consumption. Accordingly, our national energy conservation objectives dictate increased usage of foods and beverages which are reconstituted from granulated materials. Food and beverage service institutions, such as restaurants, cafeterias, schools and hospitals, are likely to experience the major portion of the anticipated increased usage of such foods and beverages.

Various devices for dispensing a measured quantity of water to a container with granulated food or beverage concentrate material therein are well known in the food and beverage industry. One such device is disclosed in U.S. Pat. No. 4,164,964, issued to Daniels, for a "Fluid Dispenser for Reconstituting Beverages and the Like". That device grips the cover or cap of the container, perforates the cover or cap of the container with a sharp-tipped nozzle, and fills the container with turbulent water to enhance mixing while the granulated food or beverage concentrate material is being reconstituted. Devices for efficiently dispensing a measured quantity of granulated food or beverage concentrate material to a container for subsequent reconstitution when water is dispensed to the container by known devices, such as the device in U.S. Pat. No. 4,164,964, are not known in the food and beverage industry.

It is desirable to have a device for efficiently dispensing a measured quantity of granulated food or beverage concentrate material to a container. Such a device should provide means for maintaining the granulated food or beverage concentrate material to be dispensed in a dry and sanitary condition prior to dispensing. Such a device should be capable of efficient and reliable operation for extended periods of time. Preferably, such a device should provide means for adjusting the volume of each portion of granulated food or beverage concentrate material which is dispensed. It is also preferred that such a device be constructed for convenient maintenance by replacement of one or more modules comprising the electro-mechanical components necessary for operation of the device in the event of malfunction of any such component. The need for such a device for use by various food and beverage service institutions, such as restaurants, cafeterias, schools and hospitals, is widely acknowledged in the food and beverage industry.

SUMMARY OF THE INVENTION

The present invention provides a new and improved device for dispensing a measured quantity of granulated food or beverage concentrate material to a container. The dispenser of the present invention comprises a generally rectangular exterior housing having a recessed container filling station in its front. The electro-mechanical components of the dispenser are positioned in the interior of the exterior housing. The majority of the electro-mechanical components are attached to the underside of a base plate which divides the interior of the housing into upper and lower compartments. In this manner, the operative components are contained in the lower compartment isolated from the granulated materials which are contained in the upper compartment in the interior of the housing. Isolation of the electro-mechanical components from the granulated material to be dispensed prevents any spilled material from interfering with operation of the dispenser and assures that the dispenser complies with all applicable health and sanitation requirements.

An air-tight, hopper-like container which functions as both a shipping and storage container and an operational storage container is filled with granulated food or beverage concentrate material and sealed by a manufacturer of such materials. The hopper-like container is shipped to a food and beverage service institution which uses the dispenser of the present invention. When it is desired to dispense the contents of the hopper-like container, the container is positioned in the upper compartment in the interior of the housing. The container has a generally rectangular configuration with a lower portion which rests on an inclined support plate having an electric vibrator attached to its underside. The funnel-shaped lower portion of the hopper-like container has a cylindrical discharge spout which is positioned in a material transfer tube through the base plate and opened for dispensing operations.

The lower end of the material transfer tube extends into the container filling station and functions as a valve seat. A dispensing valve having a rubber valve head is pivotedly attached to the underside of the base plate. Electro-responsive means are provided for opening and closing the dispensing valve. Means are also provided for controlling the length of time that the dispensing valve remains open, and, thereby, controlling the quantity of granulated material which is dispensed. Means are provided for operating the dispenser when a cup or other similar container is positioned in the container filling station.

These and many other features and advantages of the present invention will be apparent from the following brief description of drawings, detailed description of the preferred embodiment and claims.

BRIEF DESCRIPTION OF THE DRAWINGS

FIG. 1 is a perspective view of a granulated material dispenser embodying concepts of the present invention.

FIG. 2 is a fragmentary side elevation, in partial section, of the granulated material dispenser illustrated in FIG. 1.

FIG. 3 is a plan view, in partial section, as viewed in the direction of the arrows 3—3 in FIG. 2, illustrating a base plate having the principal electromechanical components of the granulated material dispenser mounted on its underside.

FIG. 6 is a block diagram of one embodiment of an electric control circuit which is suitable for operation of the granulated material dispenser illustrated in FIGS. 1, 2 and 3.

DESCRIPTION OF THE PREFERRED EMBODIMENT

Figure 4:
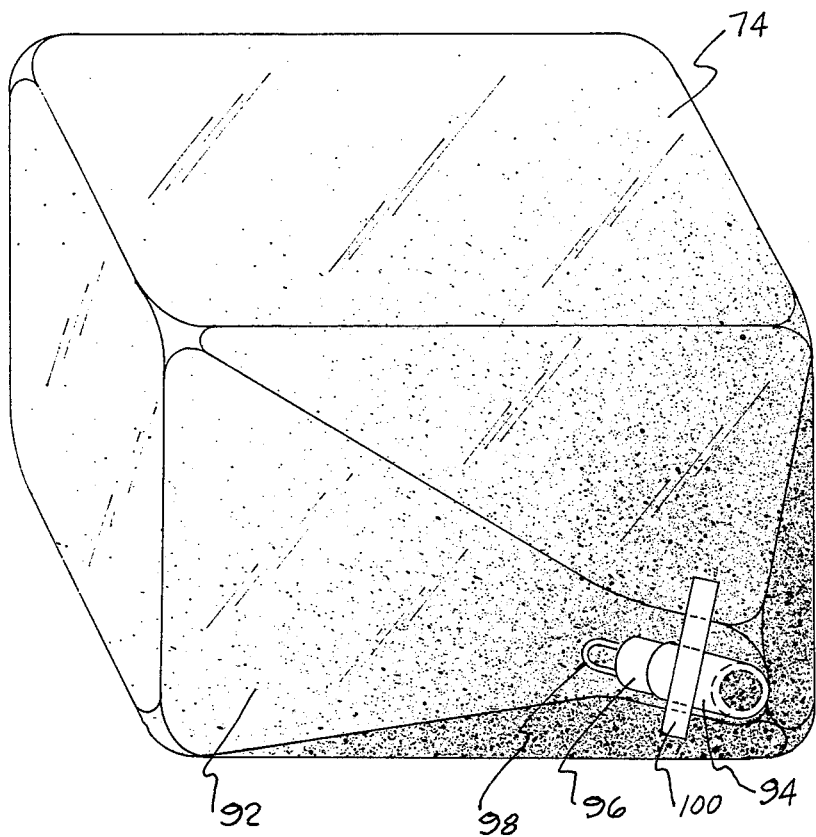
FIG. 4 is a perspective view of one embodiment of a hopper-like granulated material container which is suitable for use with the granulated material dispenser illustrated in FIGS. 1, 2 and 3.
Figure 5:
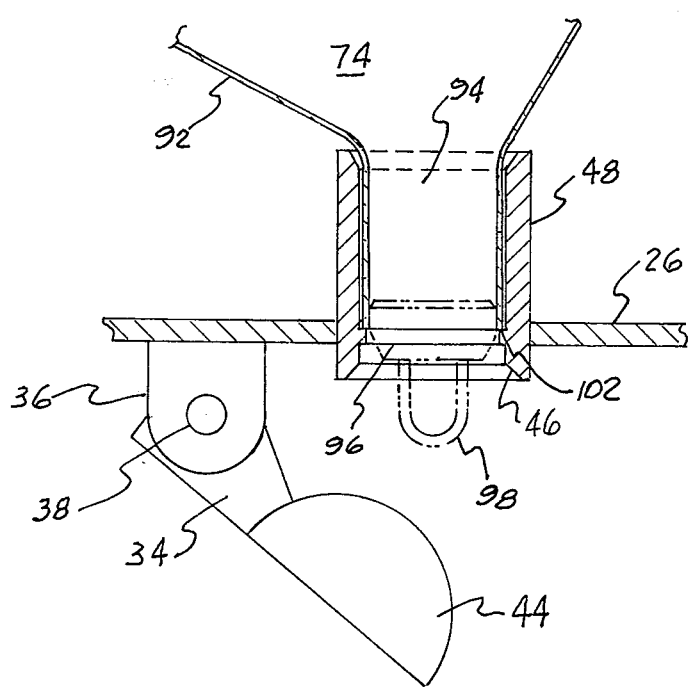
FIG. 5 is a fragmentary side elevation, in partial section, illustrating the discharge spout of the hopper-like granulated material container illustrated in FIG. 4 positioned in the granulated material transfer tube of the granulated material dispenser illustrated in FIGS. 1, 2 and 3.

The preferred embodiment of the granulated material dispenser of the present invention is illustrated in FIGS. 1–6.

Referring to FIG. 1, a granulated product dispenser 10 is illustrated on a fragmentary tabletop 12. As illustrated, the dispenser 10 comprises a generally rectangular exterior housing 14 having a recessed container filling station 16 in its front 18. An electric push-button control switch 20 is provided on the front of the housing 14 and an electric micro-switch actuating button 22 is provided at the rear of the container filling station 16. The top 24 of the housing 14 is either hinged or removable for ready access to the interior of the dispenser 10 when loading the granulated material to be dispensed and when removing the principal electro-mechanical components of the dispenser 10 for repair or replacement. Preferably, the housing 14 is fabricated from plastic or another suitable corrosion resistant material. The housing 14 can be fabricated by cutting and joining sheet materials by conventional means or, preferably, by vacuum molding. If the housing 14 is vacuum molded, it may be desirable to provide a plurality of reinforcing indentations in its walls.

FIGS. 2 and 3 illustrate the arrangement of the components in the interior of the housing 14 of the dispenser 10. Referring to FIG. 2, it will be seen that a plastic or other suitable corrosion resistant base plate 26 is positioned in the interior of the housing 14. The principal electro-mechanical components of the dispenser 10 are attached to the base plate 26 for easy removal when repair or replacement is necessary. The base plate 26 is supported by the rear wall 28 of the container filling station 16 and other conventional support means, not illustrated, which extend from the interior wall of the rear 30 of the housing 14. Such support means can be brackets, tabs or the like if reinforcing indentations are not provided in the walls of the housing 14 or the indentations themselves if such indentations are provided. If desired, the base plate 26 can be secured to the support means which are provided. However, since the combined weight of the base plate 26 and attached components is sufficient to maintain the base plate 26 in position without significant vibration or other movement during operation of the dispenser 10, it is convenient not to secure it to the support means.

The majority of the principal electro-mechanical components of the dispenser 10 are attached to the underside of the base plate 26 by conventional fastening means. Referring to FIGS. 2 and 3, it will be appreciated that the majority of the electro-mechanical components are contained in the compartment 32 in the bottom-rear of the interior of the housing 14. This isolates the control components of the dispenser 10 from the granulated material to be dispensed. Isolation of the control components in this manner prevents any spilled granular material from interfering with operation of the dispenser 10 and assures that the dispenser 10 complies with all applicable health and sanitation requirements.

Referring to FIG. 2, a dispensing valve 34 is pivotedly attached to the underside of the base plate 16 by conventional means, such as a yoke 36 and pivot pin 38. As illustrated, the yoke 36 is formed as a lower extension of a threaded bolt 40 which is passed through a hole in the base plate 26 and secured in position with a conventional nut 42. A hemispherical rubber valve head 44 is provided on one end of the dispensing valve 34 to engage a tapered valve seat 46 at the lower end of a material transfer tube 48 which passes through the base plate 26. It will be appreciated that the material transfer tube 48 functions as both a dispensing chamber and a guide for the discharge spout of the hopper-like container illustrated in FIG. 4. The dispensing valve 34, yoke 46, pivot pin 38, rubber valve head 44 and valve seat 46 at the lower end of the transfer tube 48 are positioned in the uppermost region of the container filling station 16 with the base plate 26 functioning as both a support for these componenets and a top for the container filling station 16.

The dispensing valve 34 is provided with an eccentric tail-piece 50 which is pivotedly attached to one end of a lever arm 52 having a dog-leg configuration, a triangular configuration, or other suitable configuration, by conventional means, such as a pivot pin 54. Preferably, the lever arm 52 is fabricated from a suitable self-lubricating nylon material. An electro-responsive means is provided for moving the lever arm 52, and, in turn, opening and closing the dispensing valve 34. In the preferred embodiment, the electro-responsive means is a conventional electric solenoid 56 having a plunger 58 surrounded by an electromagnetic coil 60. The solenoid 56 is attached to the underside of the base plate 26 in the compartment 32 by conventional means. One end of the plunger 58 of the solenoid 56 is pivotedly attached to one end of the lever arm 52 by convention means, such as a pivot pin 62. The lever arm 52 is moveably positioned in an opening 63 through the wall 28 separating the compartment 32 and the container filling station 16. When the coil 60 is energized, the end of the plunger 58 which is pivotedly attached to the lever arm 52 advances and pivots the dispensing valve 34. When the dispensing valve 34 pivots, the rubber valve head 44 is moved away from its normal position of rest against the valve seat 46 at the lower end of the material transfer tube 48 to allow flow of granulated material to the container filling station 16. ion such that the dispensing valve 34 is maintained in its closed mode with its rubber valve head 44 pressed against the valve seat 46 until the coil 60 is energized. Preferably, a flange 68 is provided on the plunger 58 to engage a rubber stop 70 fastened to the underside of the base plate 26 when the plunger 58 is retracted and to engage the rear of the electric solenoid 56 when the plunger 58 is advanced. The flange 68 is preferably moveable along the axis of the plunger 58 such that the distance of travel of the plunger 58 can be adjusted, if necessary, to assure efficient operation of the dispensing valve 34.

An inclined support plate 72 is positioned above the base plate 26. The inclined support plate 72 can be provided with a foot 73 which rests on the upper side of the base plate 26 as illustrated in FIG. 2 to maintain the support plate 72 in the desired position. Alternatively, parallel inclined reinforcing indentations can be provided in the side walls of the housing 14 for engaging the edges of the inclined support plate 72 to maintain the support plate 72 in the desired position. The support plate 72 is preferably fabricated from a sheet of plastic or other suitable corrosion resistant material having sufficient rigidity for support of a hopper-like container 74 filled with granulated food or beverage concentrate materials. If the support plate 72 is vacuum molded from a sheet of thin plastic material, it may be desirable to provide a plurality of parallel longitudinal reinforcing grooves for strengthening. A conventional electrically actuated vibrator is attached to the underside of the support plate 72 to facilitate free flow of the granulated materials in the hopper-like container 74 during dispensing operations. If desired, a three-sided inclined supporting element could be substituted for the inclined support plate 72.

Referring to FIG. 3, an electric terminal 78, an electric relay 80 and an electric timer 82 are attached to the underside of the base plate 26 by conventional fastening means. An opening 84 is provided through the rear 30 of the housing 14 for calibration of the timer 82 by means of the adjustment knob 86 located on the rear of the timer 82. Alternatively, the rear of the housing 14 can be hinged or removable for easy access to the compartment 32 for calibration of the timer 82 and maintenance of the various electro-mechanical components. Referring to FIG. 2, an electric micro-switch 88 or other similar rapid operation electric contact switch is mounted on the wall 28 separating the compartment 32 and the container filling station 16. The shaft of the button 22 is positioned in a cylindrical opening through the wall 28 for actuation of the micro-switch 88 in the compartment 32 when a cup or similar container is pressed against the button 22 in the container filling station 16.

The electric terminal 78, electric relay 80, electric micro-switch 88, the previously described push button control switch 20, a conventional AC power supply source 90 and associated wiring comprise one embodiment of an electric control and operation circuit for the dispenser 10. The arrangement of the electric components in an operative electric current is illustrated in FIG. 6. It will be readily appreciated by those skilled in the arts pertaining to electric and electronic circuit design that other electric and electronic control and operation circuits can be utilized with the dispenser 10. Furthermore, it would be possible to incorporate the circuit illustrated in FIG. 6 and other control and operation circuits in a conventional printed circuit board or semiconductor chip design to reduce the cost of manufacturing the dispenser 10.

While it would be possible to provide a conventional hopper in the interior of the housing 14 of the dispenser 10 for operational storage of the granulated material to be dispensed, it is preferable to provide an air-tight, hopper-like container which functions as both a shipping and storage container and an operational storage hopper for the granulated material, thereby eliminating granulated material exposure and spillage. One embodiment of such a hopper-like container 74 which is suitable for use as a component of the dispenser 10 illustrated in FIG. 4. Preferably, the hopper-like container 74 is fabricated from a sheet of heat sealable, flexible plastic, flexible metal foil, flexible moisture resistant paper or another similar flexible sheet material. In such case, the space required for shipment of empty hopper-like containers 74 from their place of manufacture of their place of filling with granulated material can be substantially reduced by shipping the containers 74 in a folded condition. Furthermore, this advantage can be achieved by fabricating the hopper-like container 74 from a relatively rigid material, such as corrugated paper, but providing a foldable design for the container 74. Of course, if one is willing to sacrifice this advantage, the hopper-like container 74 could be blow molded from a suitable plastic material. The principal requirement is that the container 74 be fabricated as an air-tight container.

The hopper-like container 74 has a generally rectangular configuration with a funnel-shaped lower portion 92 which rests on the inclined support plate 72 in the interior of the housing 14. The configuration of the funnel-shaped lower portion 92 of the hopper-like container 74, the slope of the inclined support plate 72, and the location of the material transfer tube 48 of the dispenser 10 are interdependent. A cylindrical discharge spout 94 is provided at the lowest point on the funnel-shaped lower portion 92 of the hopper-like container 74. As illustrated in FIG. 4, a cylindrical plastic or rubber plug 96 having a pull ring 98 is provided to seal the discharge spout 94 until the container 74 is positioned in the interior of the housing 14 and opened for granulated material dispensing operations. If desired, the pull ring 98 can be eliminated and the lower end of the plug 96 can be extended to provide a grip for pulling the plug 96 from the discharge spout 94. The discharge spout 94 can be taped to the funnel-shaped lower portion 92 of the hopper-like container 74 prior to filling the container 74 with granulated material. In such case, the hopper-like container 74 can be filled through an opening in its top, not illustrated in FIG. 4, and that opening can be sealed after the container 74 has been filled. When it is desired to open the hopper-like container 74 for subsequently dispensing its contents, the tape strip 100 is removed and the discharge spout 94 is positioned in the granulated material transfer tube 48 with its lower end resting on the interior support flange 102 of the transfer tube 48. Then, the dispensing valve 34 is manually pivoted to provide access to the plug 96 and its pull ring 98 and the plug 96 is removed by pulling the ring 98.

It will be readily appreciated that many other means for sealing the discharge spout 94 of the hopper-like container 74 are possible. In like manner, many other means for opening the sealed discharge spout 94 for dispensing the contents of the hopper-like container 74 are possible. For example, the open end of the discharge spout 94 can be sealed with a suitable adhesive tape which is subsequently removed to open the spout 94. Alternatively, the discharge spout 94 can be fabricated with a closed end which is opened by cutting with scissors, a knife or other suitable blade(s). Finally, it will also be appreciated that the hopper-like container 74 could be filled through its discharge spout 94 instead of providing an opening through the top of the container 74 for that purpose. This method of filling is particularly suitable for use with blow molded plastic containers.

Having described the structure of the dispenser 10, its use will now be described. First, hopper-like containers 74 are filled with granulated food or beverage concentrate materials and shipped to the food and beverage service location using the dispensers 10. It is anticipated that several dispensers 10 will be used at a single location for dispensing a variety of granulated concentrate materials for subsequent reconstitution and consumption. A hopper-like container 74 is positioned in the interior of the housing 14 in the manner described above by an employee at the food and beverage service location and the discharge spout 94 of the container 74 is opened.

The consumer or other person desiring to obtain a measured quantity of granulated concentrate for subsequent reconstitution positions a cup 104 or similar container in the container filling station 16 of the dispenser 10 such that the cup 104 presses the micro-switch actuating button 22. When the actuating button 22 is pressed with the cup 104, the shaft of the button 22 actuates the micro-switch 88 to close the control and operation circuit of the dispenser 10. The consumer then presses the push-button control switch 20 to energize the circuit, and, thereby, operate the dispenser 10. When the circuit is energized, the timer 82 first actuates the vibrator 76 for vibration of the support plate 72 to facilitate free flow of the granulated material in the hopper-like container 74 during dispensing operations. Then, the timer 82 actuates the solenoid 56 to advance the plunger 58 and pivot the dispensing valve 34 into its open position. Granulated material flows through the discharge spout 94 and material transfer tube 48 into the cup 104 until the timer 82 deactuates the solenoid 56 to retract the plunger 58 and pivot the dispensing valve 34 into its closed position. Finally, the timer 82 deactuates the vibrator 76 to stop vibration of the support plate 72 after a new charge of granulated material flows into the discharge spout 94 for subsequent dispensing. It will be readily appreciated that the dispenser 10 is suitable for use for consumer self-service or attendant operation.

While the present invention has been disclosed in connection with its preferred embodiments, it should be understood that there may be other embodiments, including coin operated dispensers, which fall within the spirit and scope of the invention as defined by the claims.

I claim:

1. A device for dispensing granulated material to a container, comprising:
    (a) a housing having a recessed container filling station;
    (b) a hopper-like container which functions as both a shipping and storage container and an operational storage container for the granulated material to be dispensed, said hopper-like container having a generally rectangular configuration with a funnel-shaped lower portion having a cylindrical discharge spout;
    (c) an inclined support plate for positioning said hopper-like container in the interior of said housing;
    (d) a granulated material transfer tube which interconnects said cylindrical discharge spout on said funnel-shaped lower portion of said container filling station, said granulated material transfer tube having a valve seat on its lower end;
    (e) a pivoted dispensing valve having a valve head which engages said valve seat on said lower end of said granulated material transfer tube to prevent flow of granulated material from said hopper-like container;
    (f) electroresponsive means for pivoting said dispensing valve to disengage said valve head from said valve seat such that granulated material is permitted to flow from said hopper-like container, through said granulated material transfer tube, and into a container positioned under said lower end of said granulated material transfer tube in said container filling station and for pivoting said dispensing valve to cause said valve head to re-engage said valve seat; and
    (g) means for controlling the period of time which said valve head remains disengaged from said valve seat.

2. A device for dispensing granulated material to a container as recited in claim 1, further comprising means for vibrating said inclined support plate.

3. A device for dispensing granulated material to a container as recited in claim 2, wherein said means for vibrating said inclined support plate comprises a vibrator attached to the underside of said inclined support plate.

4. A device for dispensing granulated material to a container as recited in claim 1, wherein said electroresponsive means comprises an electric solenoid having a plunger which moves a lever to pivot said dispensing valve and an electric circuit for control and operation of said electric solenoid.

5. A device for dispensing granulated material to a container as recited in claim 4, wherein said means for controlling the period of time which said valve head remains disengaged from said valve seat comprises a timer in said electric circuit.

6. A device for dispensing granulated material to a container, comprising:
    (a) a housing having a container filling station;
    (b) a hopper-like container which functions as both a shipping and storage container and an operational storage container for the granulated material to be dispensed, said hopper-like container having a generally rectangular configuration with a funnel-shaped lower portion;
    (c) an inclined support plate for positioning said hopper-like container in the interior of said housing, said inclined support plate having a slope which is essentially identical to the slope of said funnel-shaped lower portion of said hopper-like container;
    (d) means for vibrating said inclined support plate;
    (e) means for transferring granulated material from said hopper-like container to a container positioned in said container filling station; and
    (f) valve means for controlling the transfer of granulated material from said hopper-like container to a container positioned in said container filling station.

7. A device for dispensing granulated material to a container as recited in claim 6, wherein said means for vibrating said inclined support plate comprise a vibrator attached to the underside of said inclined support plate.

* * * * *

UNITED STATES PATENT AND TRADEMARK OFFICE
CERTIFICATE OF CORRECTION

PATENT NO. : 4,378,078

DATED : March 29, 1983

INVENTOR(S) : Paul J. Daniels

It is certified that error appears in the above-identified patent and that said Letters Patent is hereby corrected as shown below:

Column 4, line 60, "ion" should read as follows:

-- A coil spring 64 interconnects the other end of the plunger
58 and a bracket 66 attached to the underside of the base
plate 26 by conventional fastening means. The tension force
of the spring 64 biases the plunger 58 in its retracted position --.

Signed and Sealed this

Twenty-third Day of August 1983

[SEAL]

Attest:

GERALD J. MOSSINGHOFF

*Attesting Officer*     *Commissioner of Patents and Trademarks*

UNITED STATES PATENT AND TRADEMARK OFFICE
CERTIFICATE OF CORRECTION

PATENT NO. : 4,378,078
DATED : March 29, 1983
INVENTOR(S) : Paul J. Daniels

It is certified that error appears in the above-identified patent and that said Letters Patent is hereby corrected as shown below:

On the title page Insert

-- (73) Assignees: Joyce D. Hendrix, Wilmette, Ill.,
Shirley D. Alderman, Signal Mountain,
Tenn., part interest --.

Signed and Sealed this

Fifth Day of June 1984

[SEAL]

*Attest:*

*Attesting Officer*

GERALD J. MOSSINGHOFF

*Commissioner of Patents and Trademarks*